United States Patent [19]

Kinsey

[11] 3,856,123
[45] Dec. 24, 1974

[54] HANDLEBAR-MOUNTED CLUTCH ACTUATING AND GEAR SHIFTING DEVICE FOR MOTORCYCLES

[76] Inventor: Lewis R. Kinsey, 108 S. 25th St., Phoenix, Ariz. 85034

[22] Filed: Dec. 11, 1973

[21] Appl. No.: 423,695

[52] U.S. Cl. ............ 192/3.62, 192/3.63, 192/48.92, 74/475, 74/489, 74/506, 74/DIG. 7
[51] Int. Cl. ............................................. F16h 5/36
[58] Field of Search ............ 192/3.62, 3.63; 74/489, 74/506

[56] References Cited
UNITED STATES PATENTS
1,666,793   4/1928   Sanguineti ........................... 74/489

FOREIGN PATENTS OR APPLICATIONS
864,813   1/1953   Germany ............................. 74/489
1,070,949   12/1959   Germany ............................. 74/489
920,653   11/1954   Germany ............................. 74/489

*Primary Examiner*—Benjamin W. Wyche
*Attorney, Agent, or Firm*—Warren F. B. Lindsley

[57] ABSTRACT

A handlebar-mounted gear shifting device for motorcycles having a clutch actuating lever associated with the rotatable hand grip for enabling the operator to disengage the clutch and shift the transmission gears with a pressure applying and twisting motion of one hand and to visually observe the selected speed ratio.

6 Claims, 11 Drawing Figures

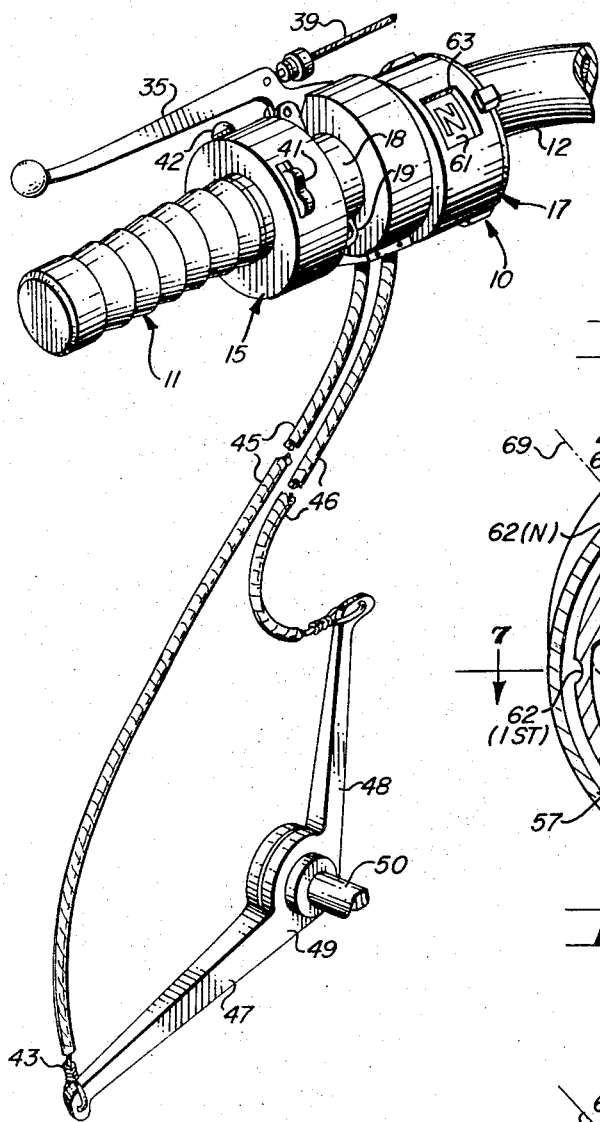
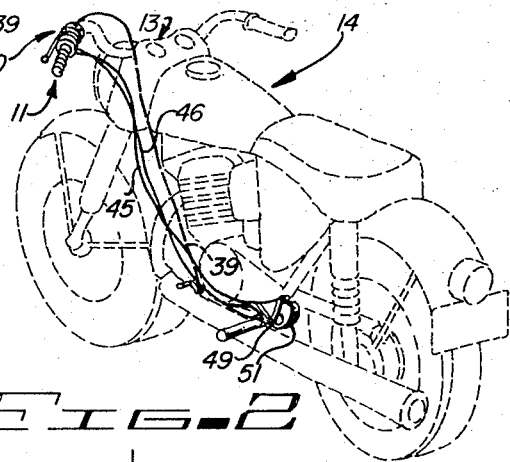
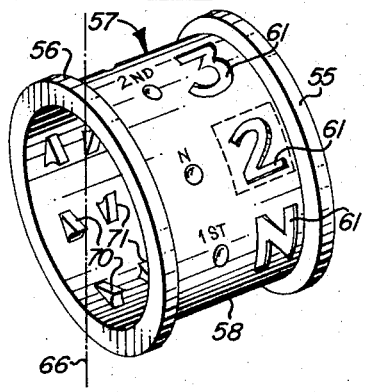
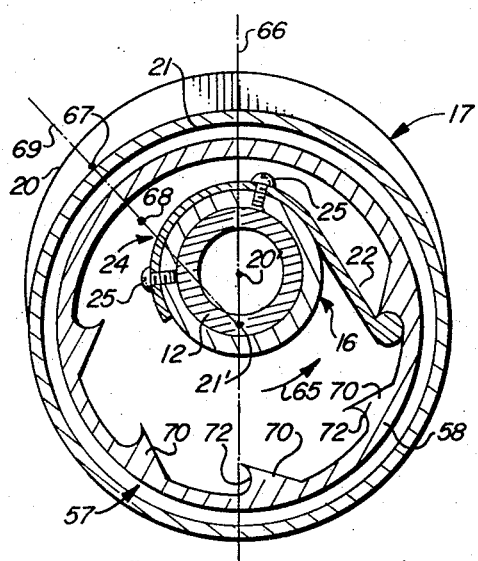

HANDLEBAR-MOUNTED CLUTCH ACTUATING AND GEAR SHIFTING DEVICE FOR MOTORCYCLES

BACKGROUND OF THE INVENTION

This invention relates to clutch actuating and gear selecting devices for motorcycles, and more particularly to such devices wherein the operator actuated components are positioned on one of the handlebars of the motorcycle.

FIELD OF THE INVENTION

This invention is directed to a combined clutch actuating and gear shifting mechanism which may be installed on a conventional motorcycle and used by the operator to perform its specific functions with ease and safety thereby eliminating the necessity of using his foot for this function as heretofore necessary.

DESCRIPTION OF THE PRIOR ART

Most of the motorcycles being built and sold today are provided with a handlebar-mounted clutch control lever and a foot operated transmission gear selector lever. The gear selector lever is mounted on the cycle's frame or transmission in a position for operation by the toe of the operator when resting on the usual foot rests. No specific means is offered by the prior art other than the natural feel of the shifting operation for indicating to the operator what gear ratio the transmission is actually in.

This type of equipment now in common use on motorcycles is inconvenient to utilize and hazardous especially when the cycle is being driven by a novice for the following reasons:

1. Many motorcycles today do have an "illuminated neutral indicator" but that is all. Many will not start with the kick-starter until the transmission is placed in neutral and that is sometimes hard to find thus causing a delay which at times can be very dangerous indeed.

2. When the operator is straddling the cycle with both feet on the ground or road surface with the engine running preparatory to take-off, balancing of the heavy cycle by one foot is necessary if the operator is going to operate the transmission gear selector lever with the other foot thus assuming another hazardous position.

SUMMARY OF THE INVENTION

It is, therefore, one object of this invention to provide a new and improved handlebar-mounted clutch actuating and gear shifting mechanism for motorcycles and snowmobiles.

Another object of this invention is to provide a new and improved clutch actuating and gear shifting device for motorcycles which is associated with one of the "Twist Hand Grips" mounted in rotative relation on one end of the arms of the handlebar withinn easy reach of the operator.

A further object of this invention is to provide an improved clutch actuating and gear shifting device including an illuminated gear ratio indicator located in full view of the operator that is automatically activated whenever the clutch actuating lever is depressed and the twist hand grip is rotated to indicate the specific gear ratio that the transmission is in.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing in which:

FIG. 1 is a perspective view showing the combined clutch actuating and gear shifting device of this invention mounted in association with one of the twist hand grips on the handlebar of a motorcycle together with its actuating cables and double-armed shift lever components and including a visual gear ratio indicator shown in neutral (N) position;

FIG. 2 is a perspective view of a conventional motorcycle having the combined clutch actuating and gear shifting device of this invention installed on one arm of the handlebar showing one method of connecting the operating cables to the clutch and gear shift control levers;

FIG. 3 is a perspective view of the large inner sleeve component utilized in conjunction with other components to change the gear ratio of the transmission and which is provided with numbers or letters on its cylindrical surface to indicate the respective gear ratio;

FIG. 4 is a transverse vertical sectional view taken along the line 4—4 of FIG. 7 showing the interior components of the shifting device in position to shift the transmission into a higher gear ratio;

FIG. 5 is a transverse vertical sectional view taken along the line 5—5 of FIG. 7 which is similar to FIG. 4 but showing the interior components of the shifting device in position to shift the indicator light numbers to match the shift of the transmission to a higher or lower gear ratio;

DESCRIPTION OF THE PREFERRED EMBODIMENT

Figure 9:
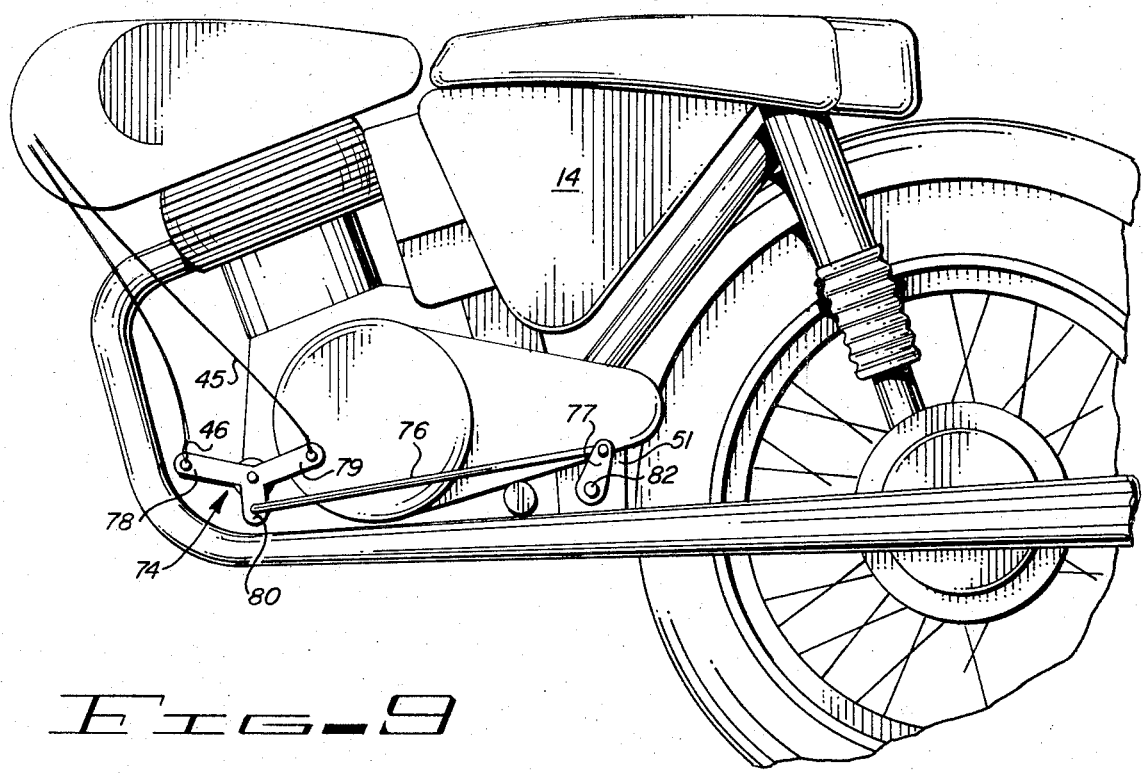
FIG. 9 is a fragmentary left side elevation of a conventional motorcycle illustrating one modified form of a remote control cable and linkage arrangement for shifting the transmission gears into the various ratios.

Referring more particularly to the drawings by characters of reference, FIGS. 1 and 2 disclose a complete assembled clutch actuating and gear shifting device 10 as it appears when mounted in association with the usual twist hand grip 11 on one of the rearwardly projecting arms 12 of the usual handlebars 13 of a conventional motorcycle 14.

The assembled clutch actuating and gear shifting device 10 as shown in FIGS. 2–7 comprises a cylindrical, partially hollow casing 15 which is provided with an integral or suitably attached tubular inner sleeve member 16 which projects into the hollow interior of a cylindrical casing 17. Casing 17 is spaced longitudinally from the cylindrical casing 15 by a split cylindrical clamping member 18 which is secured around the tubular inner sleeve member 16 by a clamping bolt 19 so as to rotate therewith whenever the twist hand grip 11 and the rear cylindrical casing 15 are rotated in either direction about the rearwardly projecting, relatively stationary arm 12 of the handlebar.

The cylindrical casing 17 is formed of two integral cylindrical portions, namely the rear portion 20, (the longitudinal axis or center line 20' of which is the same as the axis or center line of the rearwardly projecting handlebar arm 12) the tubular inner sleeve 16, the rear rotatable cylindrical casing 15 and the twist hand grip 14. The front cylindrical portion 21 of the casing 17 is offset in a vertical direction so that its longitudinal axis or center line 21' is directly below and parallel to the axis 20' of the rear cylindrical portion 20, (as shown in FIG. 4). This arrangement is provided so that the hollow interior of the casing 17 will provide sufficient clearance space for the radial movement of depending lever arms 22 and 23 which are an integral part of the arcuate indicator shifting bracket 24. Bracket 24 is secured to the forwardly projecting end of the tubular inner sleeve member 16 by means of screws 25, the purpose and function of which will be further explained.

Figure 6:
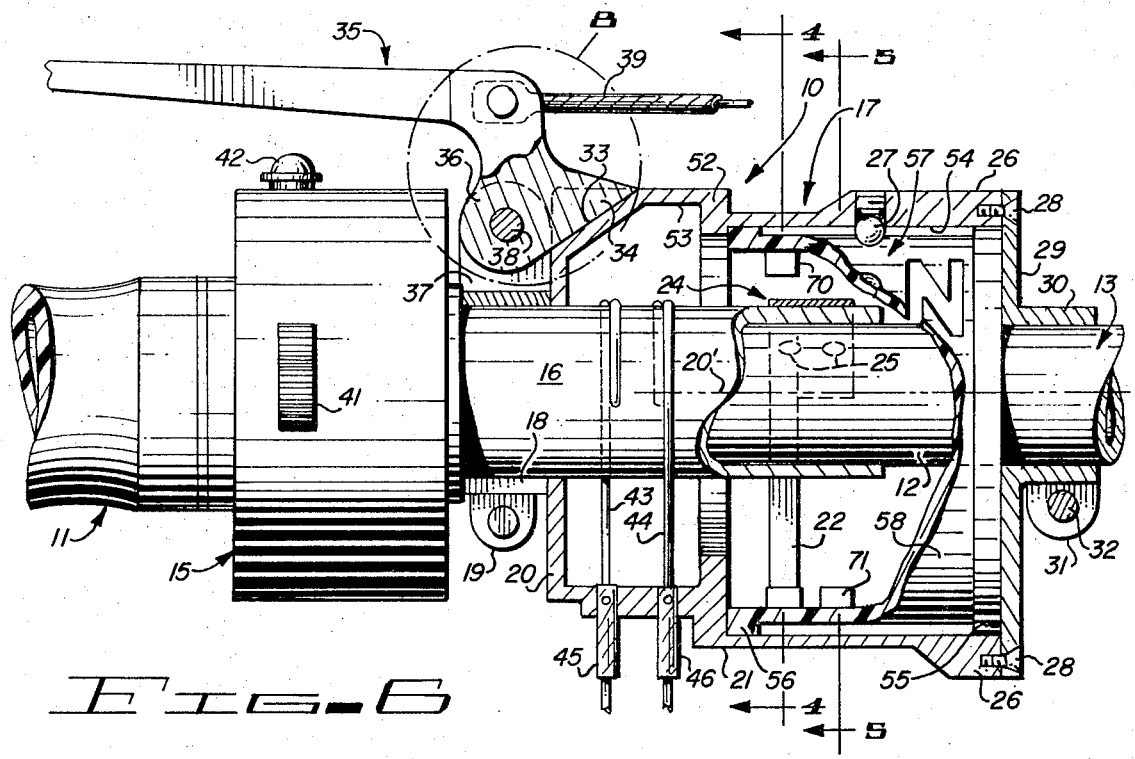
FIG. 6 is a right side elevational view of the device, partly broken away and partly in vertical section taken along the line 6—6 of FIG. 5 to more clearly illustrate the internal construction of the gear shifting components.
Figure 7:
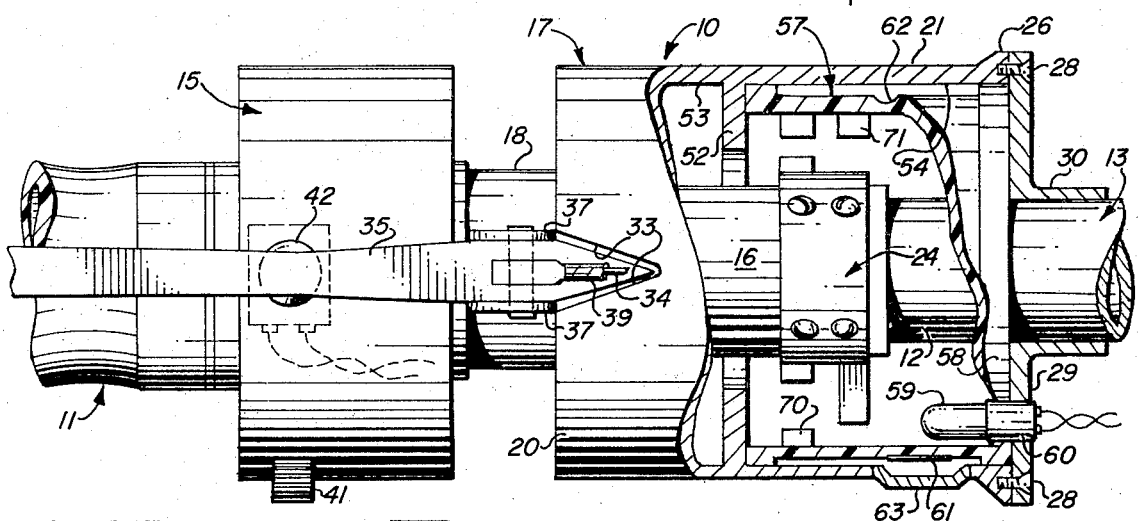
FIG. 7 is a front plan view of the device, partly broken away and partly in horizontal section taken along the line 7—7 of FIG. 6 to more clearly illustrated the internal construction of the gear shifting components and the illuminated gear ratio indicator.
Figure 8:
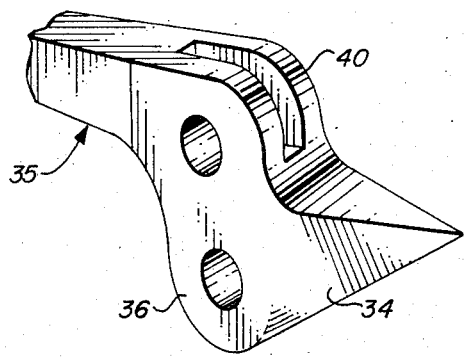
FIG. 8 is a fragmentary perspective view illustrating the preferred form of the forward end portion of the clutch actuating lever.

The outer circumferential surface of cylindrical portion 21 is provided adjacent its open end with at least four equally spaced, integral, radial abutments 26, one of which is longer and extends further toward the rear of the portion 21 to provide for the reception of a spring and ball detent 27. The front faces of these abutments are smoothly finished and flush with the front edge of that portion and each is provided with a tapped hole to receive suitable screws 28 for securely holding a removable cover plate 29. Cover plate 29 has similar radial abutments in rigid relation, to thereby cover the open end of the cylindrical portion 21 of the casing 17, as shown in FIG. 1, 6 and 7 of the drawings.

The flat surfaced cover plate 29 is provided with a forwardly projecting tubular extension 30 which is preferably integral with its flat front face and is split at one point in its diameter and provided with a pair of opposed radially extending lugs 31. Lugs 31 have aligned clearance holes that receive a clamping bolt 32 which may be tightened to securely clamp the front cylindrical portion 21 and hence the integral offset rear cylindrical portion 20 of the hollow casing 17 in non-rotatable relation about the rearwardly projecting arm 12 of the handlebars 13. The center of the detent 27 and the center of an inclined V-shaped depression 33 which is formed in the rear portion 21 is in vertical longitudinal and parallel alignment with the axes 20' and 21' of the respective rear and front portions of the cylindrical casing 17.

The inclined V-shaped depression 33 is adapted to receive a V-shaped, forwardly projecting wedge portions 34 of the clutch actuating lever 35, the lower depending end portion 36 of which is pivoted between a pair of upstanding lugs 37 which are integral with the tubular split clamping member 18. Clamping member 18 surrounds the rotatable inner sleeve member 16 and is rotatable therewith by means of a pivot pin 38. The clutch actuating lever 35 is depressed to release the clutch from driving relationship by the center wire, flexible control pull cable 39. One end of pull cable 39 is secured in pivoted relationship in a vertical slot 40 formed in the forward end of lever 35. The other end of pull cable 39 is remotely connected to the usual clutch operating lever (not shown) to simultaneously depress the clutch actuating lever 35 to release the clutch. This action lifts the V-shaped wedge portion 34 (of the same form as V-shaped, inclined depression 33 formed in the rear cylindrical portion 20 of the non-rotatable casing 17) to allow the associated components of the device including the twist hand grip 11 and the rear cylindrical casing 15 (containing the usual light switch 41 and a special push-button operated light switch 42) to be rotated in a clockwise or counter-clockwise direction. This action simultaneously activates the push-button light switch 42 which energizes a bulb 59 in casing 17 by the easy, one-hand manipulation of the clutch actuating lever 35 and the twist hand grip 11 by the operator.

It should be noted that whenever the clutch actuating lever 35 is depressed to thereby disengage the spring pressure plates of the clutch to allow selective rotation of the related components described above to change the gear ratio of the transmission, that the V-shaped wedge portion 34 is lifted a sufficient distance out of the V-shaped inclined depression 33 to allow its bottom edge to clear the rear top edge of the fixed cylindrical casing portion 20 to provide easy rotation of the associated rotatable components.

When the clutch actuating lever 35 is depressed and the described rotatable components are turned in either direction by means of the combined, one-hand manipulation or twisting movement of lever 35 and the twist hand grip 11 the tubular inner sleeve 16 rotates about the stationary handlebar arm 12 resulting in the winding up and consequent pulling action on one or the other center wires 43 or 44 of cables 45 and 46. The ends of wires 43 and 44 are each fixed to sleeve 16 so as to wind around the same in opposite directions.

The center pull wires 43 and 44 are each attached at their respective lower ends to the respective ends of an angularly disposed radially projecting arms 47 and 48 of a sector or quadrant 49 which is fixed to a rotatable shaft 50. Shaft 50 functions to actuate the gear changing forks (not shown) of a motorcycle's transmission 51 when shaft 50 is rotated in either direction by a pull on one of the center wires 43 or 44 of the cables 45 and 46. This action exerts pressure on the radial arms 47 or 48 of quadrant 49 caused by the winding of one of the wires around the inner sleeve member 16 and the loosening of the other wire when the twist hand grip 11 and the clutch actuating lever 35 are rotated together in either direction. Thus, the transmission gears are shifted into a lower or higher transission gear ratio.

The vertically offset front cylindrical portion 21 of the stationary hollow casing 17 is integrally joined and divided from the rear cylindrical portion 20 by a common portioning internal wall or rim 52. Rim 52 extends radially a short distance into the bases 53 and 54 of the respective front and rear portions of casing 17 to thereby confine the flat end surfaces of a pair of front and rear circular rims 55 and 56. Rims 55 and 56 are formed as an integral part of a rotatable cylindrical sleeve member 57 mounted between the inside surfaces of cover plate 29 and the partition wall 52. These rims provide thrust bearing surfaces for and limit the lateral movement in either direction of the cylindrical sleeve member 57 when rotated in bore 54 of the front portion of casing 17.

The outside diameter of the body portion 58 of cylindrical sleeve 57 is somewhat less than the outside, identical diameters of its rims 55 and 56. The diameters of rims 55 and 56 are slightly less than the circular finished bore 54 of the front cylindrical portion 21 in which it is adapted to rotate freely. The body portion 58 and the rims 55 and 56 are preferably molded or fabricated of long wearing, strong, abrasive-resistant plastic material such as nylon to withstand the constant back and forth rotatative motion it will be subjected to. Bulb 59 is mounted in a socket 70 in the cover plate 29 so as to extend into the bore of the cylindrical sleeve member 57 closely adjacent the inside circular wall of the body portion 58 to provide the necessary illumination for the numbers or letters 61 that are printed in spaced relation around the outside circumferential surface of the body portion 58 of the sleeve 57.

The outside circumferential surface of the slleeve's body portion 58 is also provided with at least five circular depressions 62 that are radially equally spaced apart, 45 degrees from the vertical center of the upper semi-circular half portion of said surface. These depressions are aligned longitudinally and radially with the centers of each number or letter so that when the cylindrical outer sleeve member 57 is rotated in either direction by means of lever arms 22 and 23 of the arcuate shifting bracket 24, the ball of the spring detent 27 with which the depressions 62 are aligned will be allowed to enter each depression as it is rotated and yieldingly hold the cylindrical gear ratio indicating sleeve member 57 temporarily from further rotation. Thus, the respective gear ratio the transmission has been placed in is visually indicated by one of the illuminated numbers or letters 61 being placed in clear viewing relation to the motorcycle operator through the clear plastic window 63 secured in the cylindrical wall of the front portion 21 of the stationary casing 17. This number or letter will be indicated until such time as the transmission is shifted into another gear ratio.

With reference to FIG. 5 of the drawings, the respective gear ratio positions that the transmission is in when the ball of the spring detent 27 is yieldingly retained in the cylindrical sleeve member 57 is indicated by the inscriptions 1st, N (neutral), 2nd, 3rd, 4th and 5th. These inscriptions represent the radial position of each circular depression 62 relative to the spring and ball detent 27.

It should be evident from the information pointed out in the preceding paragraph that in order for the gear ratio indicating numbers or letters 61 to appear through the clear plastic window 63 in clear view of the motorcycle operator, this window must be located on the upper right side of the front cylindrical portion 21 of the stationary casing 17 about 45 degrees from the vertical center-line 66. This zone passes through the respective axes 20' and 21' of the front and rear offset portions of the casing, the center of one of the circular depressions 62 and the center of the spring and ball detent 27 that is occupying that specific depression. The critical locations of the clear plastic window 63 and bulb 59 is shown in its preferred position in FIG. 1 and is indicated by the points 67 and 68 on the diagonal lines 69 in FIGS. 4 and 5 which pass through axis 21' of the rotatable outer sleeve member 57.

Figure 3A:
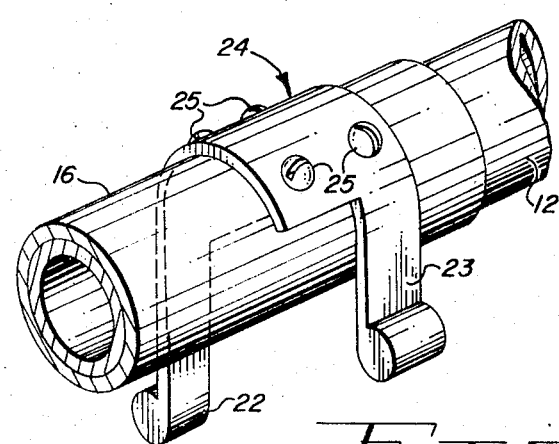
FIG. 3a is a perspective view of the tubular inner sleeve indicating shifting bracket showing in more detail in FIGS. 4, 5, 6 and 7.

In order to present the proper gear ratio insignia such as the letter "N" (for neutral) or the figure "2" (for second gear) directly under the window 63 for good viewing by the operator, the figure "2" should be printed on the cylindrical surface of the body portion 58 of the sleeve member 57 with its approximate center in longitudinal and radial alignment with the next radially spaced circular depression 62. As shown in FIG. 3, whenever the centrally located ball of the spring detent 27 is in any one of the circular depressions 62 representing a particular gear ratio, that ratio as indicated by a number or letter on the sleeve 57's outer surface will be presented directly under the clear plastic viewing window 63.

To accomplish the above described feature of this invention, a means for rotating the cylindrical sleeve member 57 in either direction at the same time the gear ratio is being changed by the winding of either the pull wire 43 or 44 around the inner sleeve member 16 by the turning of the twist hand grip 11, the sleeve member 57 is provided on the lower semi-circular portion of its inside diameter with two parallel integral rows of radially inwardly projecting socket cams 70 and 71, respectively. Each have six cams in each row, the arcuate sockets 72 and 73 of which are radially spaced the same distance apart as the semi-circular row of circular depression 62, directly above, with their respective arcuate sockets facing in opposite directions, as clearly shown in FIGS. 3, 4 and 5 of the drawings.

As previously described, the forwardly extending end of the tubular inner sleeve 16 is provided with the arcuate indicator shifting bracket 24. Bracket 24 has depending rear and front spring steel lever arms 22 and 23, respectively, that have cylindrical lower end portions which are adapted to engage in either of the uppermost arcuate sockets 70 or 71 to rotate the cylindrical sleeve 57 one segment, or the equal radial distance between the circular depressions 62 and the arcuate sockets each time the inner sleeve member 16 is rotated in either direction by the twist hand grip 11. Such action places the transmission in the desired gear ratio. For example, when the ball of the detent is in the uppermost circular depression 62 representing the second speed ratio, as shown in FIG. 5, the twist hand grip 11 would have to be rotated two consecutive times in the direction of the arrow 65 (in FIG. 3 and 4) and allowed to return each time to its normal position in order to change the gear ratio of the transmission into its fourth speed position, with the ball of the detent 27 in the proper depression 62 and the numeral " 4" showing in the clear plastic window 63.

It should be understood that the clutch lever 35 must always be depressed to remove its V-shaped wedge portion 34 from the V-shaped, inclined depression 33 in the rear cylindrical portion 20 of the stationary casing 17 before the twist hand grip 11 and its associated rotatable components can be turned in either direction to shift the transmission gears. This feature is a safety measure, ensuring definite release or disengagement of the clutch before each gear change, and by the illumination of the numbers or letters that appear in the clear plastic window 63 inform the operator what gear ratio the transmission is in. Thus, the mechanism will prevent any accidental exchange or engagement of the gears.

It should also be understood that the clutch actuating lever 35 is practically self-centering, that is, it will always return to its central locked position with its V-shaped wedge portion 34 in the V-shaped inclined depression 30 after each rotary shifting movement. The many compression springs in the usual disc-type clutch (not shown) will tend to cause the radially projecting arms 47 and 48 of the sector or quadrant 49 and the center pull wire of the clutch control cable 39 to return to their normal positions, causing the center pull wires 43 or 44 to be unwound, thus helping to rotate the inner sleeve member 16, the clutch actuating lever 35, the rear rotatable casing 15 and the twist hand grip 11 in the opposite direction. This action causes the wedge portion 34 of the clutch lever to enter the inclined depression 33 to be thus temporarily locked therein.

One some motorcycles it might be difficult to arrange the flexible gear shifting cables 45 and 46 so that they present little or no interference with the normal movements of the operator's feet. To prevent this possible interference, FIGS. 9 and 10 illustrate two modified forms of a remote control arrangement designed to eliminate the possibility of such interference.

Figure 10:
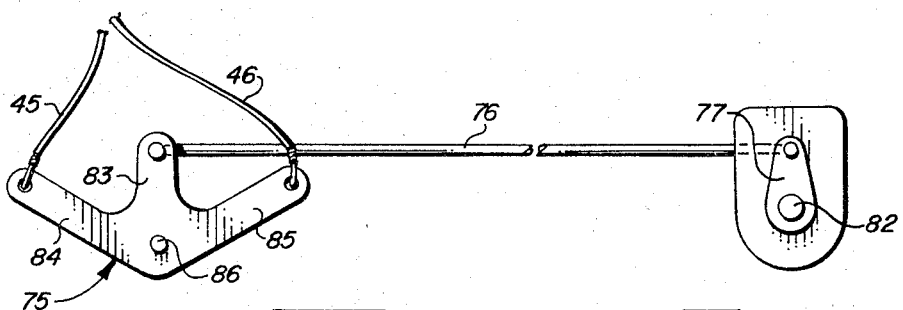
FIG. 10 is an enlarged side elevational view similar to FIG. 9 illustrating another modified form of the remote control cable and linkage arrangement.

In FIGS. 9 and 10, a control linkage is shown which consists of pivoted sectors or quadrants 74 and 75 utilized together with suitable push-pull rods 76 to actuate the pivoted transmission shifting lever 77 and its shaft 82 by means of the previously described flexible control cables 45 and 46.

The sector or quadrant 74 shown in FIG. 9 is provided with a pair of radially projecting lever arms 78 and 79 and an integral, depending lever arm 80 to the bottom end of which the forward end of the push-pull rod 76 is pivotally attached. The rear end of push-pull rod 76 is pivotally attached to the top end of the transmission shifting lever 77. The center wires of the flexible cables 45 and 46 are attached to the respective outer ends of lever arms 78 and 79 so that when a pull is exerted on either of the lever arms by the center-wires of the cables quadrant 74 will be rotated about its pivot point 81. This action actuates the transmission shifting lever 77 and rotates the same and its rotatable shaft 82 in either direction depending on which radially projecting lever arm 78 or 79 the pull is exerted on.

The general construction and function of the remote control arrangement of the cables and other linkage components shown in FIG. 10 is similar to that shown and described relative to FIG. 9 except that the sector or quadrant 75 is provided with a centrally located upstanding lever arm 83 which is integral with the radially projecting lever arms 84 and 85 to which the ends of the center-wires of the cables 45 and 46 are attached. This is in an opposite relationship to that shown in FIG. 9 so that when a pull is exerted by the cables on either of the lever arms, rotating the sector or quadrant 75 about its pivot point 86, the same relative rotary motion will be imparted to the transmission shifting lever 77 as explained for FIG. 9 to thereby rotate the shift lever 77 and its shaft 82 in a similar manner to change the gear ratio of the transmission 51 without interfering with the normal movements of the operator's feet.

Although but a few embodiments of the invention have been shown and described, it will be apparent to those skilled in the art that various changes and modifications may be made therein without departing from the spirit of the invention or from the scope of the appended claims.

What is claimed is:

1. A clutch actuating, gear shifting mechanism for mounting on the handlebar of a motorcycle and like handlebar devices comprising:

a twist hand grip for rotatably mounting around the end of a handlebar of a motorcycle, a first hollow cylindrical casing fixedly mounted around the handlebar juxtapositioned to said hand grip, said cylinder casing having a V-shaped depression formed in its outer periphery, a sleeve fixedly attached to and in axial alignment with said hand grip for rotation within said first cylindrical casing, a pair of flexible cables one end of each being fixedly attached to said sleeve for rotation therearound in opposite directions upon rotation of said sleeve, the other ends of said cables being attached to opposite ends of a lever arm which is fixedly attached to the rotating shaft of a gear shifting mechanism, a clutch lever being spring biased for placing a protrusion thereof into said depression in the outer periphery of said sleeve for detachably positioning said hand grip relative to said first cylindrical casing, means for attaching one end of a clutch cable to one end of said clutch lever for actuation of said clutch cable whenever said clutch lever is rotated, a second hollow cylindrical casing rotatively mounted within said first cylindrical casing, means for selectively engaging said second casing with and rotated by said sleeve upon rotation of said hand grip, said second casing being provided with a plurality of indicia spaced around at least a part of the periphery of said second casing indicating the position of the gear mechanism of the associated motorcycle, and a window opening extending through said first casing in position for exposing one of said indicia indicating the position of the gear mechanism of the motorcycle.

2. The clutch actuating, gear shifting mechanism set forth in claim 1 in further combination with:

a light switch mounted on said hand grip and operated by said clutch lever for energizing a bulb in said first casing for illuminating said indicia in said window.

3. The clutch actuating, gear shifting mechanism set forth in claim 1 wherein:

a plurality of protrusions are formed on and spacedly positioned around the inner surface of said second casing, and said means for selectively engaging said second casing comprising a pair of resilient fingers secured to said sleeve one finger for engaging some of said protrusions for rotating said second casing in one direction and the other finger for engaging the rest of said protrusions for rotating said second casing in the other direction.

4. The clutch actuating, gear shifting mechanism set forth in claim 3 wherein:
said fingers comprise ball like configurations at their free ends, and
said protrusions comprise cup shaped cavities for receiving the ball like configurations at the free ends of said fingers.

5. The clutch actuating, gear shifting mechanism set forth in claim 3 wherein:
said means for selectively engaging said second casing comprises a U-shaped member mounted to straddle the outer periphery of said sleeve with the free ends of the legs comprising said fingers.

6. The clutch actuating, gear shifting mechanism set forth in claim 1 wherein:
said other ends of said cables are attached to opposite ends of a lever arm,
said lever arm being rotatably mounted on the motorcycle,
a second lever arm fixedly attached to the gear shifting mechanism of the motorcycle, and
cable means for interconnecting each end of said first lever arm to a different end of said second lever arm for actuating said gear mechanism of said motorcycle.

* * * * *